United States Patent [19]

Tanaka et al.

[11] Patent Number: 5,774,503
[45] Date of Patent: Jun. 30, 1998

[54] DEMODULATION METHOD AND DEMODULATION DEVICE

[75] Inventors: Koichiro Tanaka, Katano; Tomonori Shiomi, Hirakata; Yasuo Nagaishi, Ikoma, all of Japan

[73] Assignee: Matsushita Electric Industrial Co., Ltd., Osaka, Japan

[21] Appl. No.: 697,164

[22] Filed: Aug. 20, 1996

[30] Foreign Application Priority Data

Aug. 22, 1995 [JP] Japan .................................. 7-213626

[51] Int. Cl.⁶ .......................... H04L 27/14; H04L 27/16; H04L 27/22
[52] U.S. Cl. ........................................... 375/324; 375/344
[58] Field of Search ..................................... 375/324, 322, 375/316, 371, 344, 350; 329/345, 346, 304, 307; 370/516

[56] References Cited

U.S. PATENT DOCUMENTS

| | | | |
|---|---|---|---|
| 4,620,160 | 10/1986 | Waggener | 329/104 |
| 4,953,186 | 8/1990 | Levy et al. | 375/118 |
| 5,142,287 | 8/1992 | LaBerge et al. | |
| 5,311,546 | 5/1994 | Paik et al. | 375/14 |
| 5,434,884 | 7/1995 | Rushing et al. | 375/235 |

OTHER PUBLICATIONS

M. Uchishima et al., "Burst DSP Demodulator for Low Eb/No Operation", Conf. Rec. IEEE Int. Conf. Commun. vol. 1991, No. vol. 1, pp. 226–230, 1991.

Primary Examiner—Stephen Chin
Assistant Examiner—Michael W. Maddox
Attorney, Agent, or Firm—Wenderoth, Lind & Ponack, L.L.P.

[57] ABSTRACT

An oscillator 1 generates a local oscillation signal. A quadrature detector 2 converts an inputted carrier band signal into an equivalent low-frequency signal on the basis of the local oscillation signal. A complex multiplier 3 performs complex multiplication of the equivalent low-frequency signal and a complex coefficient to output a detection signal. An amplitude error detecting portion 4 detects a complex amplitude error of the detection signal. A coefficient error calculating portion 5 calculates a quantity proportional to an error of the complex coefficient from the complex amplitude error and the equivalent low-frequency signal and outputs it. A filter 6 converts the output of the coefficient error detecting portion into a complex coefficient and provides it to the complex multiplier 3. A data regenerating portion 7 converts the detection signal into demodulation data and outputs it.

5 Claims, 6 Drawing Sheets

FIG. 8 PRIOR ART ial is shown in FIG. 8. Signal points of the detection
DEMODULATION METHOD AND DEMODULATION DEVICE

BACKGROUND OF THE INVENTION

1. Field of the Invention

The present invention relates to a demodulation method and a demodulation device for demodulating a carrier band signal and outputting data.

2. Description of the Background Art

It is generally necessary in a demodulation device to cancel a phase error of an inputted carrier signal. This function can be realized by performing complex multiplication after converting the carrier signal into a complex signal called an equivalent low-frequency signal.

Figure 6:
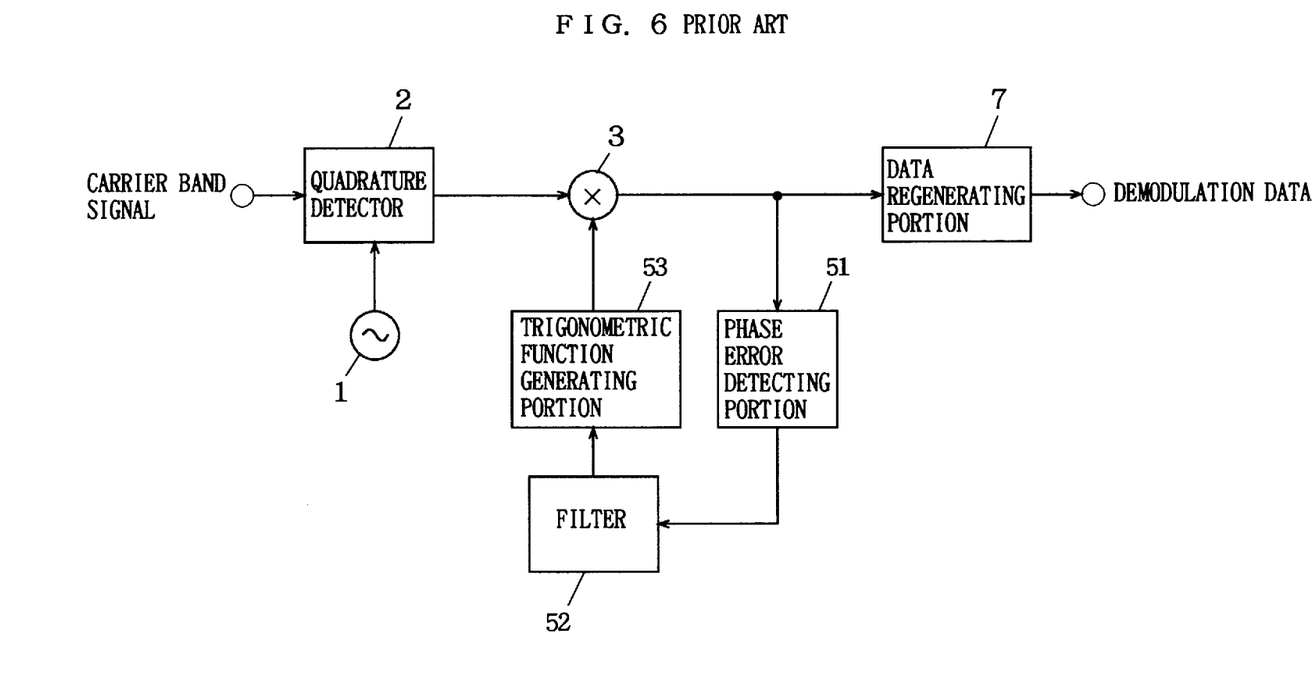
FIG. 6 is a block diagram showing the structure of a conventional demodulation device.

Now, a conventional demodulation device will be described. FIG. 6 is a block diagram showing the structure of a conventional demodulation device. In FIG. 6, this demodulation device includes an oscillator 1, a quadrature detector 2, a complex multiplier 3, a phase error detecting portion 51, a filter 52, a trigonometric function generating portion 53, and a data regenerating portion 7. Such kind of demodulation device is described in "Burst DSP Demodulation for Low EB/NO Operation" (M. Uchishima et al., Conf. Rec. IEEE Int. Conf. Commun. Vol. 1991, No. Vol. 1, pp. 226–230, 1991).

The oscillator 1 generates a local oscillation signal. The quadrature detector 2 converts an inputted carrier band signal into an equivalent low-frequency signal on the basis of the local oscillation signal. This equivalent low-frequency signal is a complex number composed of an amplitude representing an in-phase component with respect to the local oscillation signal and an amplitude representing a quadrature component with respect to the local oscillation signal in the carrier band signal. The complex multiplier 3 performs complex multiplication of the equivalent low-frequency signal by a complex coefficient to correct the phase of the equivalent low-frequency signal and outputs a detection signal. The phase error detecting portion 51 compares a phase of the detection signal and a phase of a signal point in an ideal state to output a phase error. The filter 52 removes a noise component from the phase error and performs an integration to output a correction phase. The trigonometric function generating portion 53 converts the correction phase into the complex coefficient. The data regenerating portion 7 judges the detection signal and provides data, and as needed, it also converts parallel data strings corresponding to a complex number into one serial data string to output demodulation data.

Figure 7:
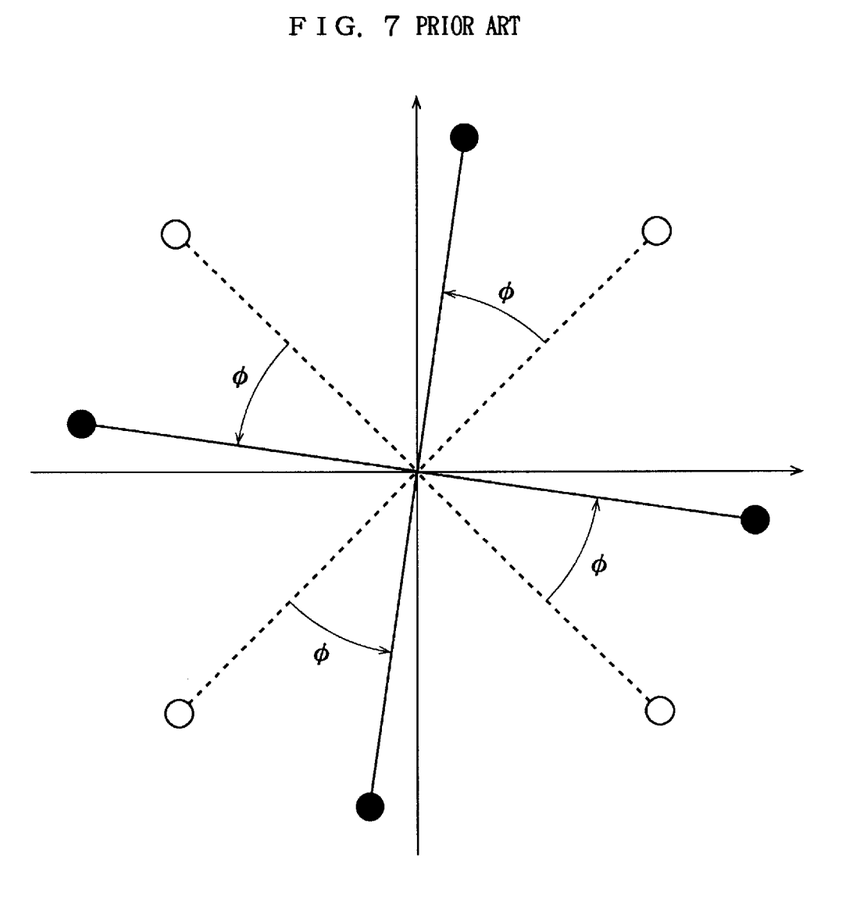
FIG. 7 is an explanation drawing of an equivalent low-frequency signal and its phase error.

The operation of the demodulation device of FIG. 6 will now be specifically described in an example of the QPSK modulation system. Since the phase of the local oscillation signal is independent of the phase of the transmission side which generated the carrier band signal, the equivalent low-frequency signal outputted by the quadrature detector 2 can be illustrated on a rectangular plane as shown in FIG. 7. This equivalent low-frequency signal takes one of the four signal points shown by the solid lines (black points) in FIG. 7 according to data to be transmitted. On the other hand, the four signal points shown by the broken lines (white points) show phases given on the transmission side according to the transmission data. The equivalent low-frequency signal is shifted by an angle Φ with respect to the phase given on the transmission side. In order to correctly regenerate the data, it is necessary in the demodulation device to inversely rotate the signal points shown by the solid lines by the angle Φ to correct them to the original signal points shown by the broken lines. The complex multiplier 3 multiplies the equivalent low-frequency signal by a complex coefficient representing the rotation to create an original signal point, i.e., a detection signal.

Figure 8:
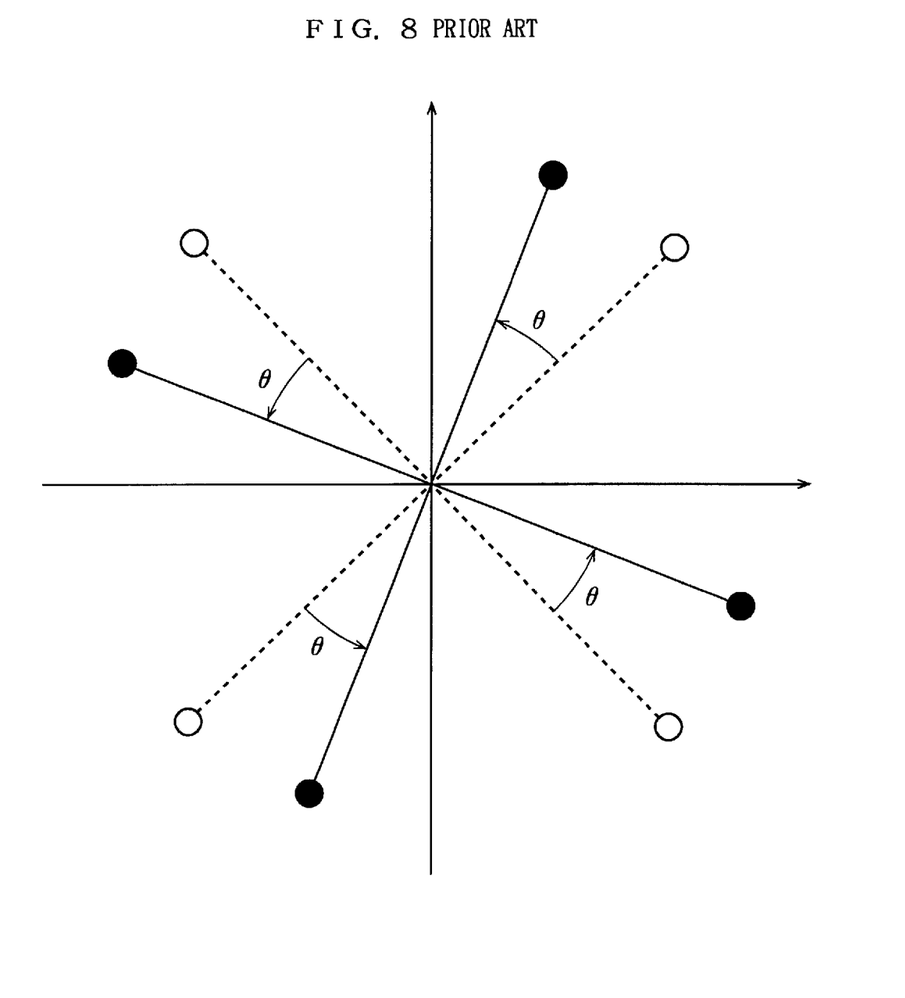
FIG. 8 is an explanation drawing of a detection signal and its phase error.

Now, assuming that a phase error remains in the detection signal outputted by the complex multiplier 3, this detection signal is shown in FIG. 8. Signal points of the detection signal are shown by solid lines (black points) and phases provided on the transmission side are shown by broken lines (white points) as in FIG. 7. The character θ shows the remaining phase error, which is obtained by the phase error detecting portion 51 from the detection signal represented in a rectangular coordinate system. The filter 52 takes out a low-frequency component of change of θ to remove effect of noise and also gradually moves the correction phase in the minus θ direction. This gradual moving operation is usually realized by an integration. The trigonometric function generating portion 53 generates a cosine function and a sine function with respect to the correction phase and outputs a set of the two functions as a complex coefficient. The complex coefficient is supplied to the above-mentioned complex multiplier 3 to achieve correction of phase.

The control loop composed of the complex multiplier 3, the phase error detecting portion 51, the filter 52 and the trigonometric function generating portion 53 finally eliminates the phase error included in the detection signal.

As has been stated above, the conventional demodulation device, which generates a phase, a signal in a polar coordinate system, from a complex number, a signal in a rectangular coordinate system, in the phase error detecting portion 51, requires generation of an inverse trigonometric function, presenting the problem of an increase in circuit scale. Even if this inverse trigonometric function is made approximation in rectangular coordinate system operation, a complicated circuit or a large numerical table is required in the following trigonometric function generating portion 53, leading to an increase in circuit scale. Although the circuit scale can be reduced by decreasing operation accuracy of these structures, the detection signal can not be correctly calculated then, which leads to the problem of an increase of errors in demodulation data.

SUMMARY OF THE INVENTION

It is an object of the present invention to provide a demodulation device with smaller circuit scale without deterioration of demodulation data error rate characteristic.

The present invention has such features as shown below to achieve the object above.

According to a first aspect of the present invention, a method for correcting a phase error of an inputted carrier band signal and demodulating the carrier band signal comprises:

converting the carrier band signal into an equivalent low-frequency signal;

performing a complex multiplication of the equivalent low-frequency signal and a complex coefficient to obtain a detection signal;

detecting a complex amplitude error of the detection signal;

performing a complex division of the complex amplitude error by the equivalent low-frequency signal to calculate a complex coefficient error;

subtracting a complex number which is obtained by multiplying a low-frequency component of the complex coefficient error by a constant from the complex coefficient to obtain a new complex coefficient; and converting the detection signal into demodulation data.

As stated above, according to the first aspect, a complex coefficient for correction is obtained without converting an error of a detection signal into a phase, i.e., without using an inverse trigonometric function or a trigonometric function. Accordingly, a highly accurate demodulation device having no deterioration of demodulation data error rate characteristic can be realized with small circuit scale. Furthermore, since it also has a function of minimizing the error of the detection signal, it also presents the effect of automatically keeping the amplitude of the detection signal at a prescribed value.

According to a second aspect of the present invention, a method for correcting a phase error of an inputted carrier band signal and demodulating the carrier band signal comprises:

converting the carrier band signal into an equivalent low-frequency signal;

performing a complex multiplication of the equivalent low-frequency signal and a complex coefficient to obtain a detection signal;

detecting a complex amplitude error of the detection signal;

performing a complex multiplication of the complex amplitude error by a complex conjugate of the equivalent low-frequency signal to calculate a value proportional to a complex coefficient error, subtracting a complex number which is obtained by multiplying a low-frequency component of the value proportional to the complex coefficient error by a constant from the complex coefficient to obtain a new complex coefficient; and converting the detection signal into demodulation data.

According to the second aspect, as stated above, a complex amplitude error is complex multiplied by a complex conjugate of an equivalent low-frequency signal to calculate a value proportional to a complex coefficient error and a new complex coefficient is obtained using this value. Since it is generally possible to realize a complex multiplication in a simpler operation process than a complex division, the circuit scale can be further simplified as compared with the first aspect.

According to a third aspect of the present invention, a device for correcting a phase error of an inputted carrier band signal and demodulating the carrier band signal comprises:

an oscillator for generating a local oscillation signal;

a quadrature detector for converting the carrier band signal into an equivalent low-frequency signal on the basis of the local oscillation signal;

a complex multiplier for performing a complex multiplication of the equivalent low-frequency signal and a complex coefficient to output a detection signal;

an amplitude error detecting portion for detecting a complex amplitude error of the detection signal;

a coefficient error calculating portion for calculating a quantity proportional to a complex coefficient error from the complex amplitude error and the equivalent low-frequency signal;

a filter for converting an output of the coefficient error calculating portion into the complex coefficient; and a data regenerating portion for converting the detection signal into demodulation data.

In the third aspect, similarly to the first aspect, a complex coefficient for correction is obtained without converting an error of a detection signal into a phase, i.e., without using an inverse trigonometric function or a trigonometric function. Accordingly, a highly accurate demodulation device having no deterioration of demodulation data error rate characteristic can be realized with small circuit scale. Furthermore, since it also has a function of minimizing the error of the detection signal, it also produces the effect of automatically keeping the amplitude of the detection signal at a defined value.

In the third aspect, the coefficient error calculating portion may consist of a complex divider for complex dividing the complex amplitude error by the equivalent low-frequency signal. Or, the coefficient error calculating portion may consist of a complex multiplier for multiplying the complex amplitude error by a complex conjugate of the equivalent low-frequency signal. In view of circuit scale, the use of a complex multiplier is more advantageous than the use of a complex divider.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
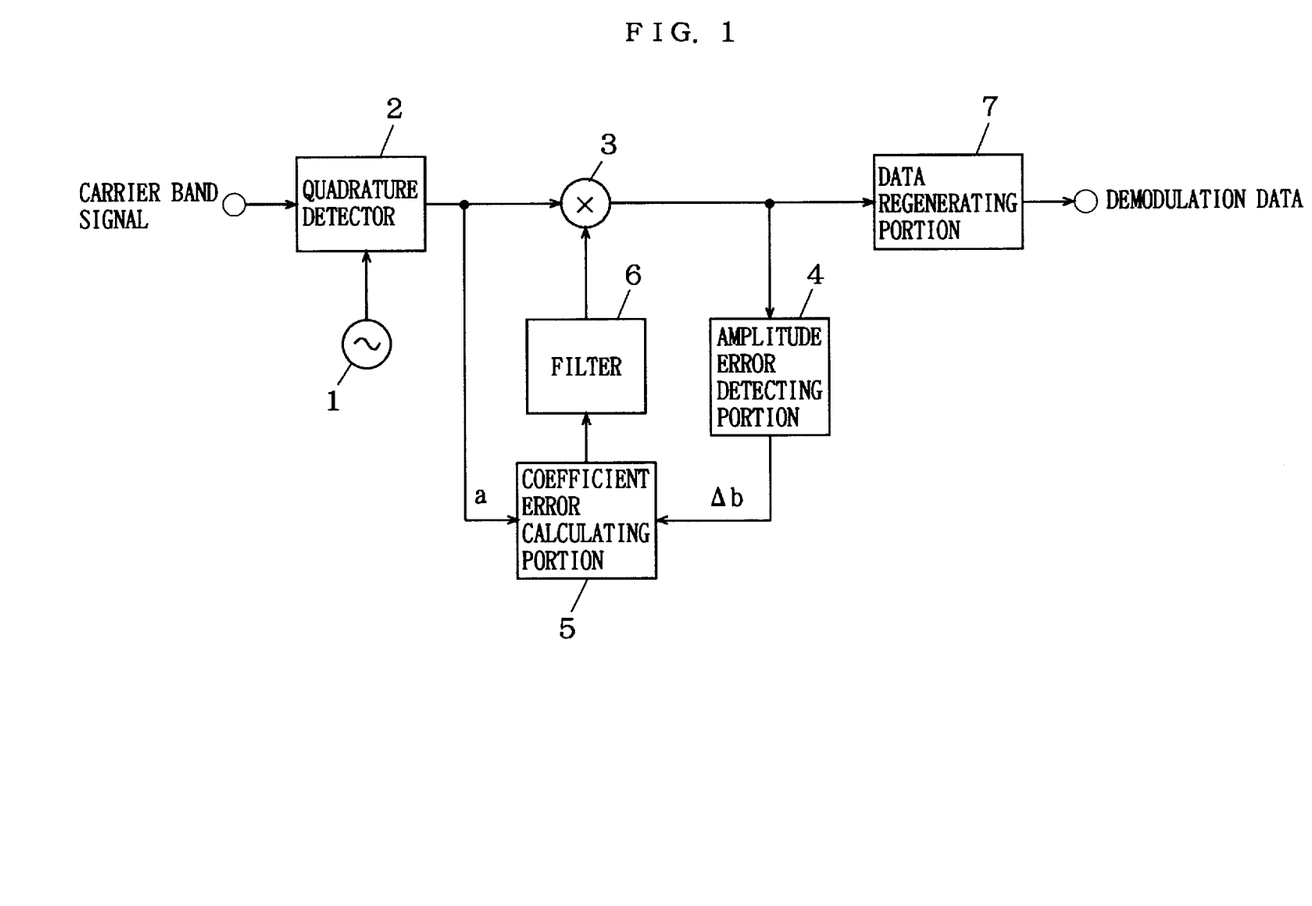
FIG. 1 is a block diagram showing the structure of a demodulation device according to an embodiment of the present invention.
Figure 2:
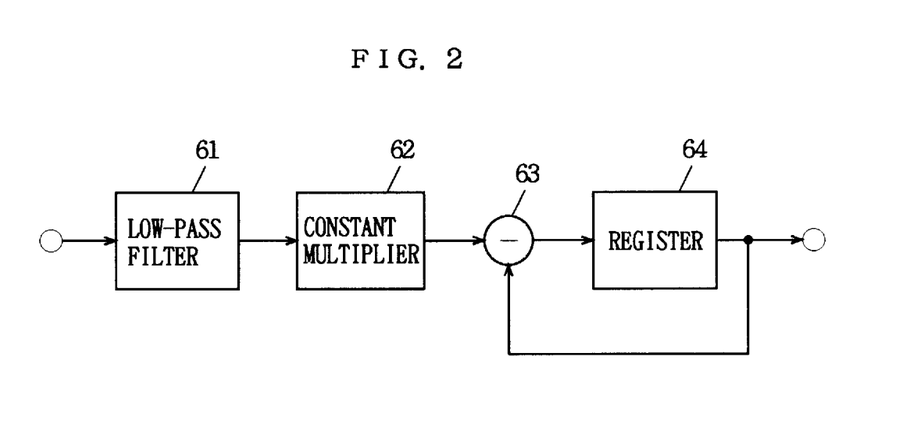
FIG. 2 is a block diagram showing in detail the structure of the filter in FIG. 1.

FIG. 1 is a block diagram showing the structure of a demodulation device according to an embodiment of the present invention. In FIG. 1, the demodulation device of this embodiment includes an oscillator 1, a quadrature detector 2, a complex multiplier 3, an amplitude error detecting portion 4, a coefficient error calculating portion 5, a filter 6 and a data regenerating portion 7. As shown in FIG. 2, the filter 6 includes a low-pass filter 61, a constant multiplier 62, a subtracter 63 and a register 64.

The oscillator 1 generates a local oscillation signal. The quadrature detector 2 converts an inputted carrier band signal into an equivalent low-frequency signal on the basis of the local oscillation signal. The equivalent low-frequency signal is a complex number formed of an amplitude representing an in-phase component with respect to the local oscillation signal and an amplitude representing a quadrature component with respect to the local oscillation signal in the carrier band signal . The complex multiplier 3 performs complex multiplication of the equivalent low-frequency signal by a complex coefficient to correct the phase of the equivalent low-frequency signal and outputs a detection signal. The amplitude error detecting portion 4 compares the complex amplitude of the detection signal and a complex amplitude of a signal point in an ideal condition to output a complex amplitude error. The coefficient error calculating portion 5 calculates a quantity proportional to an error of the complex coefficient from the complex amplitude error and the equivalent low-frequency signal and outputs it. The filter 6 converts the output of the coefficient error calculating portion 5 into a complex coefficient and provides it to the complex multiplier 3. The data regenerating portion 7 judges the detection signal and provides data, and it also converts parallel data strings corresponding to a complex number into one serial data string as needed and outputs demodulation data.

Figure 3:
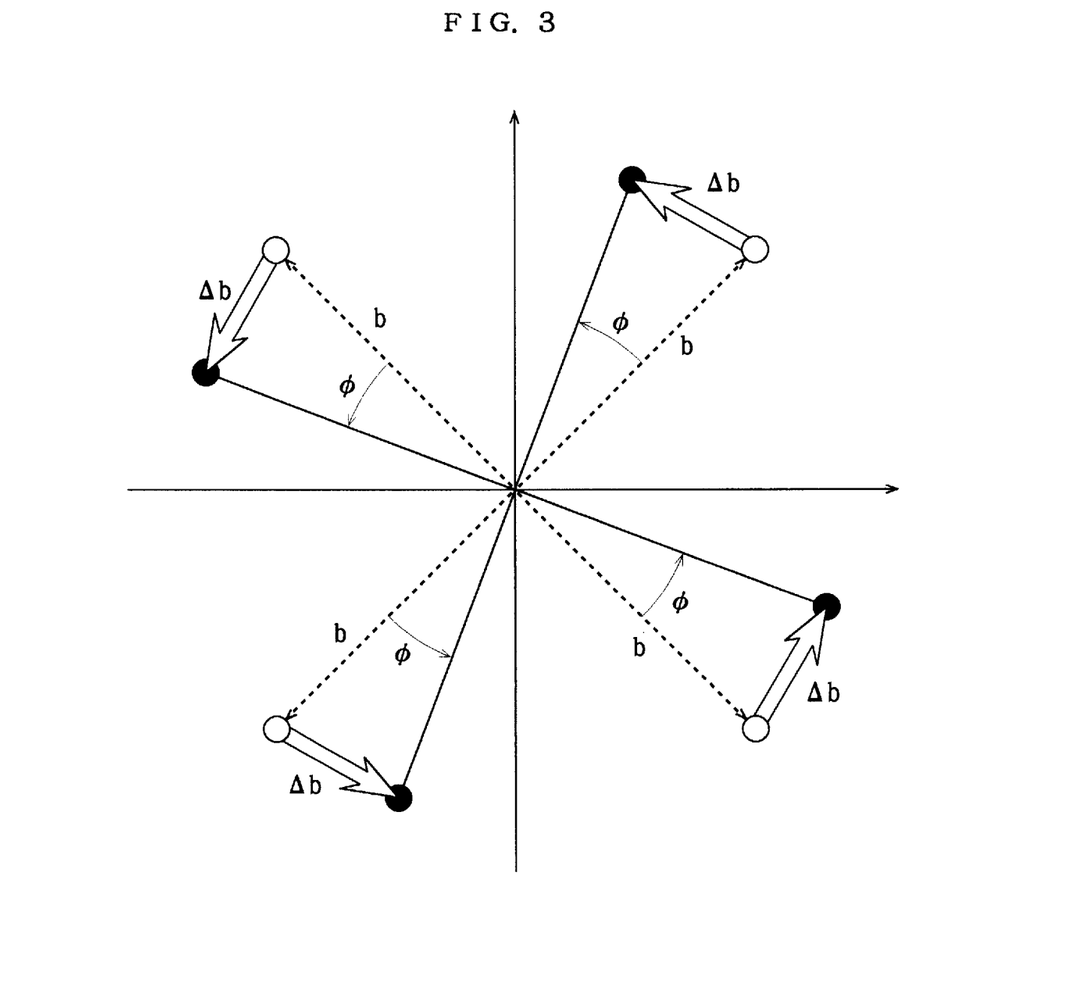
FIG. 3 is an explanation drawing of a detection signal and its complex amplitude error.

The operation of the demodulation device of this embodiment having the structure above will be specifically explained in an example of the QPSK modulation system. Since the phase of the local oscillation signal is independent of the phase on the transmission side which generates the carrier band signal, the equivalent low-frequency signal outputted by the quadrature detector 2 can be illustrated in a rectangular plane as shown in FIG. 3. This equivalent low-frequency signal takes one of the four signal points shown by the solid lines (black points) in FIG. 3 depending on data to be transmitted. On the other hand, the four signal points shown by the broken lines (white points) denote phases given on the transmission side according to the transmission data. The equivalent low-frequency signal is shifted by an angle $\Phi$ with respect to the phase given on the transmission side. In order to correctly regenerate data, it is necessary in the demodulation device to inversely rotate the signal points shown by the solid lines by the angle $\Phi$ to correct them to the original signal points shown by the broken lines. The complex multiplier 3 must multiply the equivalent low-frequency signal by a complex coefficient expressing the rotation to create an original signal point, i.e., a detection signal.

Figure 4:
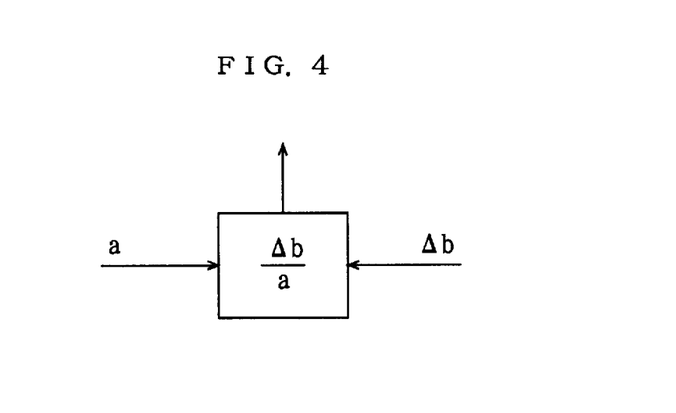
FIG. 4 is a block diagram showing an example of the structure of the coefficient error calculating portion in FIG. 1.

The complex amplitude error is shown by the symbol $\Delta b$ in FIG. 3. This complex amplitude error $\Delta b$ is a difference between a signal point of the detection signal and a signal point b which is the closest to it among signal points corresponding to the phases provided on the transmission side. The amplitude error detecting portion 4 subtracts b from the detection signal to obtain this $\Delta b$. The coefficient error calculating portion 5 basically obtains a complex coefficient error by performing complex division of the complex amplitude error $\Delta b$, which is a complex number, by the equivalent low-frequency signal a, which is a complex number as shown in FIG. 4.

The operation of calculating the complex coefficient error will be described in more detail. While the detection signal can be expressed as a sum of the ideal signal point b and the complex amplitude error $\Delta b$, the cause of the complex amplitude error $\Delta b$ is an error included in the complex coefficient inputted to the complex multiplier 3. If this complex coefficient is represented as a sum of an ideal value c and an error $\Delta c$, the detection signal can be given by the following expression (1).

$$b+\Delta b=(c+\Delta c)a \quad (1)$$

When the complex coefficient is at an ideal value and no error is caused in the detection signal, then the detection signal can be represented by the expression (2) given below.

$$b=ca \quad (2)$$

By subtracting the expression (2) from the expression (1), the complex amplitude error $\Delta b$ can be given by the expression (3).

$$\Delta b=\Delta c \cdot a \quad (3)$$

It is seen from the expression (3) above that $\Delta c$ can be obtained by complex dividing $\Delta b$ by a.

As shown in FIG. 2, the low-pass filter 61 in the filter 6 output a low-frequency component of the complex coefficient error $\Delta c$ in order to remove effect of noise. The constant multiplier 62 multiplies the low-frequency component by an adequate constant k to output a correction value $k\Delta c$. The constant k is selected to a sufficiently small value in order to prevent the correction value from becoming too large to make the change of the complex coefficient unstable. The subtracter 63 subtracts the correction value $k\Delta c$ from the complex coefficient $c+\Delta c$ held in the register 64 to obtain a new complex coefficient $c+(1-k)\Delta c$. The complex coefficient is corrected in the direction opposite to the error by the operation of the subtracter 63 and it gets closer to the ideal value c. The register 64 holds the new complex coefficient as a complex coefficient for the next point at the time when the next complex coefficient error is inputted to the low-pass filter 61. An output of the register 64 is an output of the filter 6. Although the low-pass filter 61, the constant multiplier 62 and the integrator (composed of the subtracter 63 and the register 64) are arranged in this order herein, the order of arrangement matters little because they all perform linear operation.

The complex coefficient outputted from the filter 6 is supplied to the aforementioned complex multiplier 3, which performs correction of phase.

The control loop composed of the complex multiplier 3, the amplitude error detecting portion 4, the coefficient error calculating portion 5 and the filter 6 eventually eliminates the phase error included in the detection signal. The correction control is applied not only to phase but also to amplitude by using the complex amplitude error obtained from the signal point of the detection signal and the signal point corresponding to the phase given on the transmission side, and therefore the amplitude of the detection signal finally achieves an amplitude of a predetermined signal point.

Figure 5:
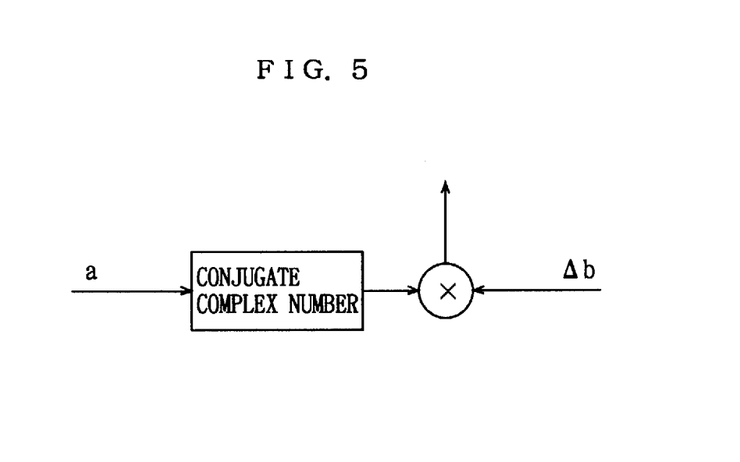
FIG. 5 is a block diagram showing another example of the structure of the coefficient error calculating portion in FIG. 1.

Although the complex amplitude error is complex divided by the equivalent low-frequency signal in the coefficient error calculating portion 5, the complex amplitude error $\Delta b$ may be multiplied by a complex conjugate of the equivalent low-frequency signal a, instead, as shown in FIG. 5. This is due to the fact that the control loop correctly operates if the complex coefficient error outputted by the coefficient error calculating portion 5 has a correct direction. For more detailed description, refer to the expressions (4) and (5) given below.

$$\Delta b/a=(\Delta b \cdot conjg(aa))/|a|^2 \quad (4)$$

$$\Delta b \cdot conjg(a)=|a|^2 \cdot (\Delta b/a) \quad (5)$$

In expressions (4) and (5), as stated above, $\Delta b$ indicates a complex amplitude error and "a" indicates an equivalent low-frequency signal, and $conjg(a)$ indicates a complex conjugate of a. Since the expression (4) is obtained by rewriting the complex division and the expression (5) can be derived from the expression (4), it is seen that the complex multiplication result is proportional to the complex coefficient error $\Delta b/a$, i.e., they have the same direction. Using the complex multiplication instead of the complex division further reduces the circuit scale.

Although the description has been made in an example of QPSK modulation system, it is clear that the present invention can be applied to all modulation systems in which an equivalent low-frequency signal is determined according to transmission data. In 16 QAM, for example, the amplitude error detecting portion 4 obtains a difference between a signal point of a detection signal and a signal point which is the closest to it in sixteen signal points. The data regenerating portion outputs any of sixteen kinds of data. Operations of other components are the same as those in the case of QPSK. The present invention which controls the amplitude of a detection signal to a defined value as stated above is suitable also for demodulation of a quadrature amplitude modulation signal such as 16QAM.

While the invention has been described in detail, the foregoing description is in all aspects illustrative and not restrictive. It is understood that numerous other modifications and variations can be devised without departing from the scope of the invention.

What is claimed is:

1. A method for correcting a phase error of an inputted carrier band signal and demodulating the carrier band signal, comprising:

converting said carrier band signal into an equivalent low-frequency signal;

performing a complex multiplication of said equivalent low-frequency signal and a complex coefficient to obtain a detection signal;

detecting a complex amplitude error of said detection signal;

performing a complex division of said complex amplitude error by said equivalent low-frequency signal to calculate a complex coefficient error;

subtracting a complex number which is obtained by multiplying a low-frequency component of said complex coefficient error by a constant from said complex coefficient to obtain a new complex coefficient; and converting said detection signal into demodulation data.

2. A method for correcting a phase error of an inputted carrier band signal and demodulating the carrier band signal, comprising:

converting said carrier band signal into an equivalent low-frequency signal;

performing a complex multiplication of said equivalent low-frequency signal and a complex coefficient to obtain a detection signal;

detecting a complex amplitude error of said detection signal;

performing a complex multiplication of said complex amplitude error by a complex conjugate of said equivalent low-frequency signal to calculate a value proportional to a complex coefficient error;

subtracting a complex number which is obtained by multiplying a low-frequency component of said value proportional to said complex coefficient error by a constant from said complex coefficient to obtain a new complex coefficient, and converting said detection signal into demodulation data.

3. A device for correcting a phase error of an inputted carrier band signal and demodulating the carrier band signal, comprising:

an oscillator for generating a local oscillation signal;

a quadrature detector for converting said carrier band signal into an equivalent low-frequency signal on the basis of said local oscillation signal;

a complex multiplier for performing a complex multiplication of said equivalent low-frequency signal and a complex coefficient to output a detection signal;.

amplitude error detecting means for detecting a complex amplitude error of said detection signal;

coefficient error calculating means for calculating a quantity proportional to a complex coefficient error from said complex amplitude error and said equivalent low-frequency signal;

a filter for converting an output of said coefficient error calculating means into said complex coefficient; and a data regenerating portion for converting said detection signal into demodulation data.

4. The demodulation device according to claim 3, wherein said coefficient error calculating means includes a complex divider for complex dividing said complex amplitude error by said equivalent low-frequency signal.

5. The demodulation device according to claim 3, wherein said coefficient error calculating means includes a complex multiplier for multiplying said complex amplitude error by a complex conjugate of said equivalent low-frequency signal.

* * * * *